(12) United States Patent
Schreiber et al.

(10) Patent No.: US 10,950,974 B2
(45) Date of Patent: Mar. 16, 2021

(54) CHARGING CABLE SYSTEM FOR AN ELECTRIC VEHICLE, ELECTRIC VEHICLE, AND METHODS FOR CHARGING AN ELECTRIC VEHICLE

(71) Applicants: Hyundai Motor Company, Seoul (KR); Kia Motors Corporation, Seoul (KR)

(72) Inventors: Michael Schreiber, Frankfurt am Main (DE); Stefan Hoffmann, Riedstadt (DE); Frank Wolf, Dreieich-Sprendlingen (DE); Manfredo Agresti, Bergheim (DE); Johannes Heichel, Wiesbaden (DE); Humayun Yousofzy, Solingen (DE); Uwe Meinz, Weiterstadt (DE); Balaji Sevanan Kari, Wiesbaden (DE); Marco Favilli, Frankfurt am Main (DE); Ingmar Langer, Darmstadt (DE); Eduardo Rates Garcia, Frankfurt am Main (DE); Dennis Fleischmann, Hofheim (DE)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/666,549

(22) Filed: Oct. 29, 2019

(65) Prior Publication Data

US 2021/0006010 A1    Jan. 7, 2021

(30) Foreign Application Priority Data

Jul. 5, 2019    (DE) .................. 10-2019-209961.0

(51) Int. Cl.
*H01R 13/60* (2006.01)
*H01R 13/72* (2006.01)
(Continued)

(52) U.S. Cl.
CPC .............. *H01R 13/60* (2013.01); *B60L 53/16* (2019.02); *B60L 53/18* (2019.02); *H01R 13/447* (2013.01);
(Continued)

(58) Field of Classification Search
None
See application file for complete search history.

(56) References Cited

U.S. PATENT DOCUMENTS 5,676,560 A * 10/1997 Endo ................ H01R 13/62905
                                                    439/310
5,720,627 A *  2/1998 Gillbrand ............... H01R 13/72
                                                    191/12 R
(Continued)

FOREIGN PATENT DOCUMENTS

WO         2014/209261 A1    12/2014

*Primary Examiner* — Oscar C Jimenez
(74) *Attorney, Agent, or Firm* — Mintz Levin Cohn Ferris Glovsky and Popeo, P.C.; Peter F. Corless

(57) ABSTRACT

An electric vehicle charging cable system is provided. The system includes a charging cable assembly having an electric cable and a connector device coupled thereto. The connector device includes a connector housing and a first electric contact arrangement therein. A cable storage device stores the electric cable, and a retainer device includes a retainer housing having a first receiving opening for receiving the connector device and a socket portion arranged adjacent to the first receiving opening for receiving a DC-charging plug of a charging plug. The first receiving opening defines a cross-section corresponding to an outer contact surface of the connector housing. The connector device is positionable in a stowage position in which the connector housing is received within the first receiving opening, and in a detached position to clear the first receiving opening. The (Continued)

socket portion defines a second receiving opening which accommodates a second electric contact arrangement.

12 Claims, 6 Drawing Sheets

(51) Int. Cl.
    *H01R 13/516*     (2006.01)
    *H01R 13/447*     (2006.01)
    *H02J 7/00*     (2006.01)
    *B60L 53/16*     (2019.01)
    *B60L 53/18*     (2019.01)
    *H01R 43/26*     (2006.01)
    *H01R 27/02*     (2006.01)

(52) U.S. Cl.
    CPC .......... *H01R 13/516* (2013.01); *H01R 13/72* (2013.01); *H01R 43/26* (2013.01); *H02J 7/0045* (2013.01); *H01R 27/02* (2013.01); *H01R 2201/26* (2013.01)

(56) References Cited

U.S. PATENT DOCUMENTS

| | | | |
|---|---|---|---|
| 5,751,135 A * | 5/1998 | Fukushima | B60L 53/65 320/107 |
| 5,919,048 A * | 7/1999 | Slattery | H01R 13/447 439/34 |
| 6,371,768 B1 * | 4/2002 | Neblett | H01R 13/701 439/34 |
| 6,725,986 B2 | 4/2004 | Reindle et al. | |
| 8,098,044 B2 * | 1/2012 | Taguchi | B60L 53/66 320/109 |
| 8,550,833 B2 * | 10/2013 | Martin | B60L 53/16 439/310 |
| 8,568,155 B2 * | 10/2013 | Sebald | H01R 24/28 439/304 |
| 8,834,202 B2 * | 9/2014 | Kwasny | H01R 43/20 439/604 |
| 9,908,422 B2 * | 3/2018 | Bianco | B60L 3/0069 |
| 9,975,443 B2 * | 5/2018 | Jefferies | B60L 53/16 |
| 2013/0020984 A1 | 1/2013 | Lucas et al. | |
| 2016/0280086 A1 * | 9/2016 | Lopez | B60L 53/16 |
| 2017/0125993 A1 * | 5/2017 | Krammer | H01B 7/0823 |
| 2018/0037128 A1 * | 2/2018 | Gerber | H02J 7/027 |
| 2019/0181587 A1 * | 6/2019 | Richardson | B60K 28/10 |
| 2020/0039359 A1 * | 2/2020 | Salter | B60L 53/16 |

* cited by examiner

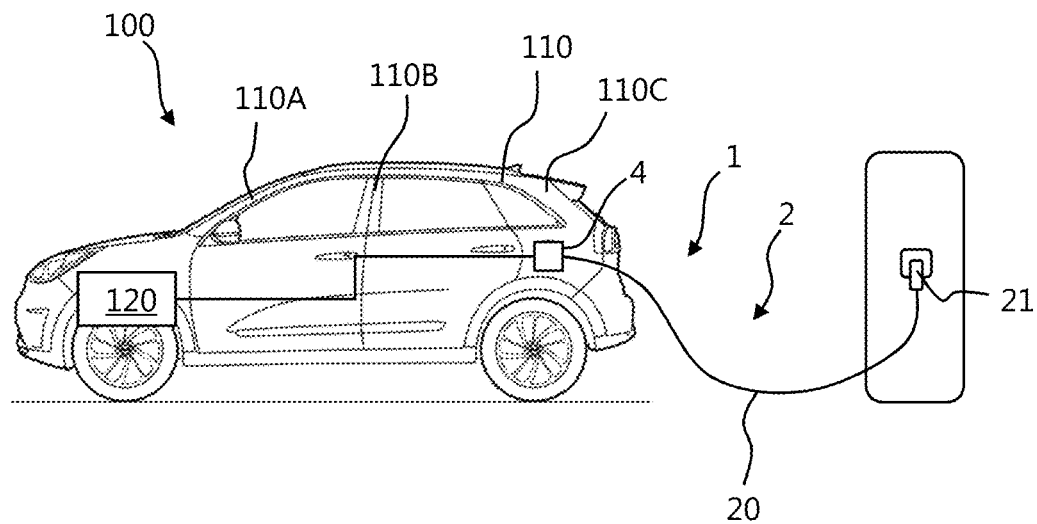
Fig. 1
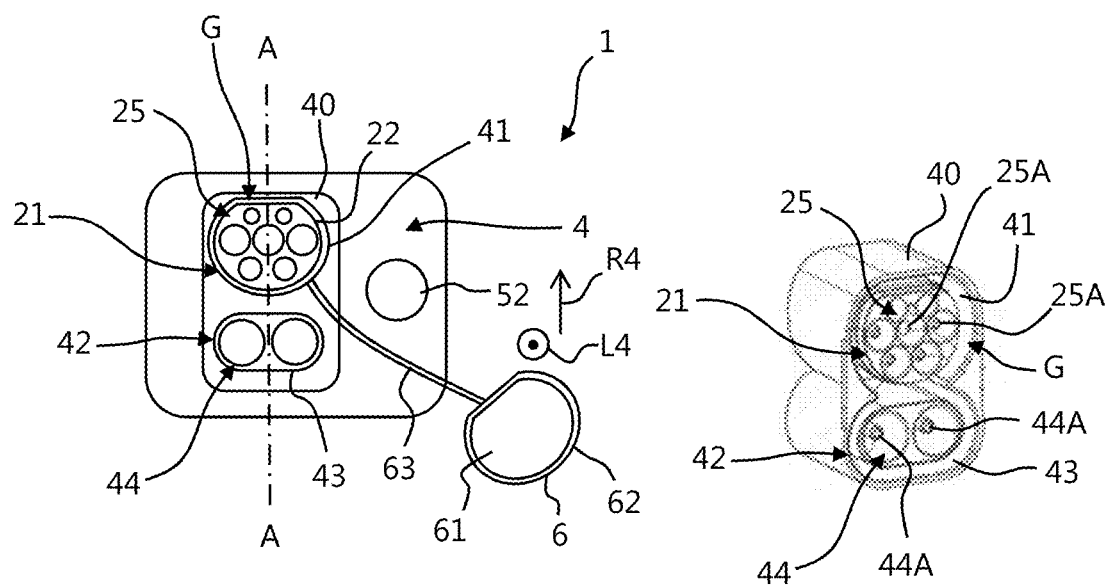
Fig. 2
Fig. 3

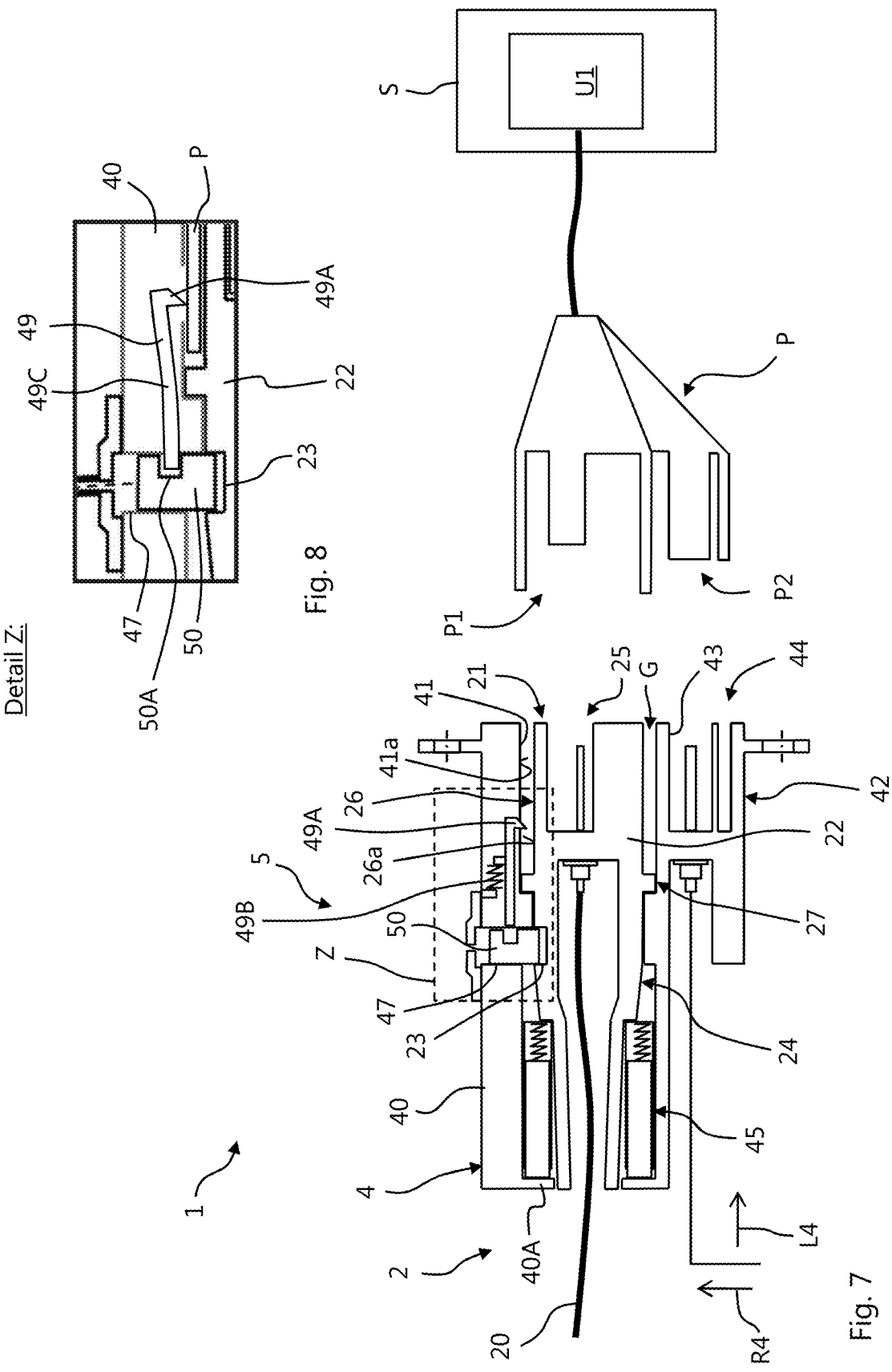

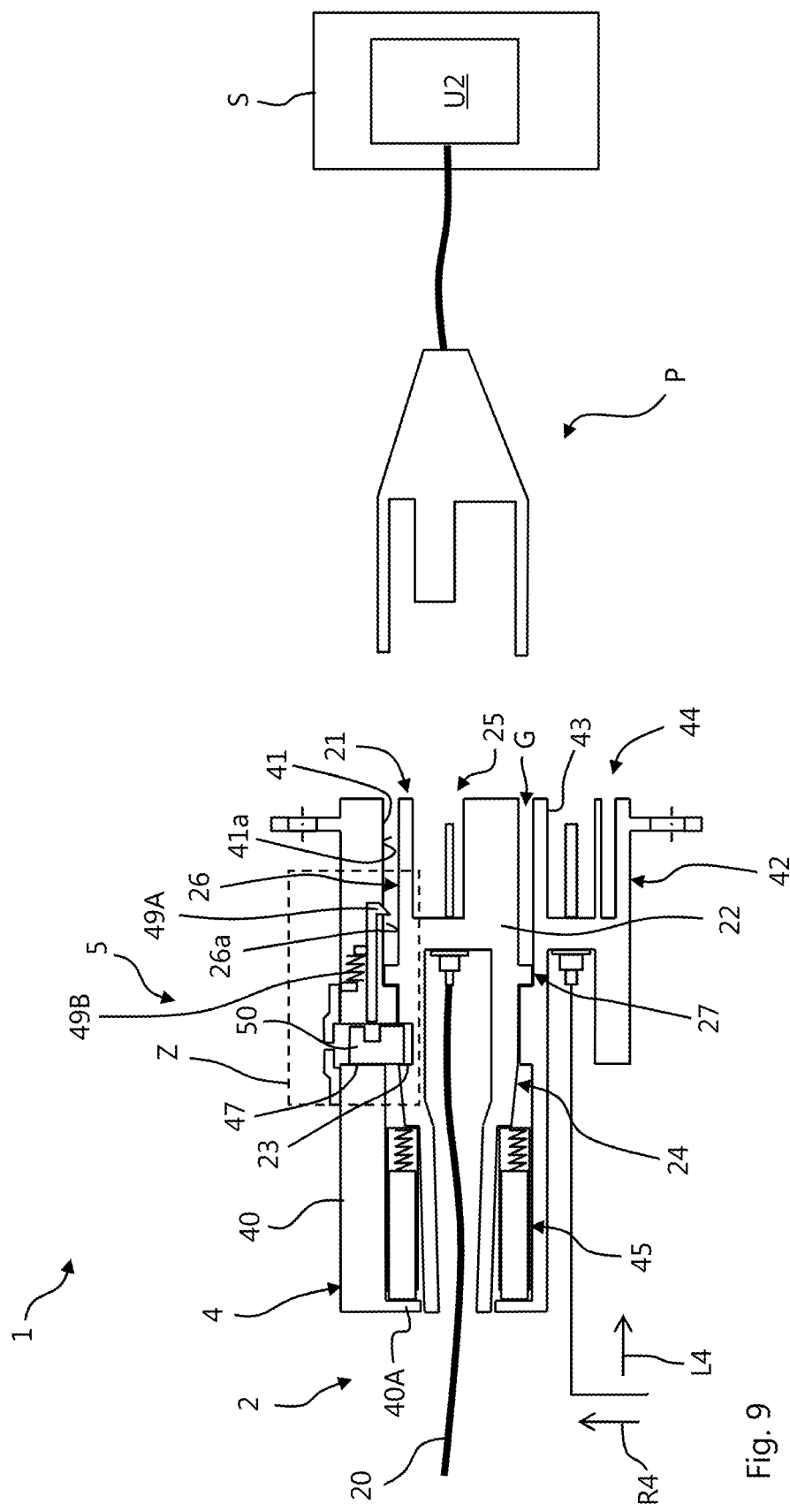

CHARGING CABLE SYSTEM FOR AN ELECTRIC VEHICLE, ELECTRIC VEHICLE, AND METHODS FOR CHARGING AN ELECTRIC VEHICLE

CROSS-REFERENCE TO RELATED APPLICATION(S)

This application claims under 35 U.S.C. § 119(a) the benefit of priority to German Patent Application No. 10-2019-209961.0 filed on Jul. 5, 2019, the entire contents of which are incorporated herein by reference.

TECHNICAL FIELD

The present invention relates to a charging cable system for an electric vehicle, an electric vehicle, and methods for charging an electric vehicle.

BACKGROUND

Generally, electric vehicles include an electric motor powered by a rechargeable electrical energy storage device such as a chargeable battery. Typically charging cables are used for charging the battery of the vehicle and a connector is provided at an end of the charging cable and is connected to an external, off-board electrical power source.

The charging cable may, for example, be stored within the cabin of the vehicle, for example in the trunk. To orderly store the cable within the cabin of the vehicle, the related art discloses a carry bag for the charging cable that is removably attached to a mounting bracket provided within the cabin. Another developed technique describes a cable reel assembly for storing a charging cable provided at an off-board charging station or an automatic cable rewinder for a vacuum cleaner.

SUMMARY

The present invention provides improved solutions for storing and handling charging cables of electric vehicles. According to one aspect, the present invention provides a charging cable system for an electric vehicle. The system may include a charging cable assembly having an electric cable and a connector device coupled to a first end of the electric cable, the connector device having a connector housing and a first electric contact arrangement accommodated within the connector housing. The electric cable may include two or more conductors accommodated within an insulating mantle. The conductors may be electrically connected to electrical contact structures or terminals, e.g. contact pins, of the first electric contact arrangement. The connector housing provides a mounting structure for the electric contact arrangement, extends in a longitudinal direction, and defines an interior for accommodating the first electrical contact structure. The contact structures of the first electrical contact structure may be arranged in accordance with IEC 62196, for example in a so called type 1 or type 2 arrangement. Alternatively the contact structures of the first electrical contact arrangement may be arranged in accordance with Chinese GB/T 20234.2 standard.

The system may further include a cable storage device for storing the electric cable. The electric cable may be coupled to the cable storage device. For example, the cable storage device may include a cable reel or another compartment that allows storing at least a portion of the length of the electric cable and pulling out at least a portion of the length of the electric cable. Optionally, the cable storage device may include a rewind mechanism for automatically pulling back the electric cable.

Additionally, the system may include a retainer device having a retainer housing. The retainer housing may include a first receiving opening that receives the connector device and a socket portion arranged adjacent to the first receiving opening that receives a direct current (DC)-plug portion of a charging plug. The first receiving opening defines a cross-section that corresponds to an outer contact surface of the connector housing of the connector device. The connector device may be positioned in a stowage position in which the connector housing is received within the first receiving opening. The connector device may further be positioned or may be movable from the stowage position to a detached position in which the connector device clears the first receiving opening. The socket portion of the retainer housing defines a second receiving opening which accommodates a second electric contact arrangement.

The first receiving opening is defined by an inner surface of the retainer housing and extends in a retainer longitudinal direction and defines a cross-sectional shape, e.g. in the form of a segment of a circle. The cross-sectional shape corresponds to a cross-sectional shape defined by an outer contact surface of the connector housing. The outer contact surface forms part of the outer surface of the connector housing. Hence, the connector housing may be introduced into the first receiving opening into a stowage position in which the outer contact surface contacts the inner surface of the first receiving opening.

The socket portion of the retainer housing may be formed adjacent to the first receiving opening with respect to a retainer radial direction extending transverse to the retainer longitudinal direction. The socket portion may include a second receiving opening. The second electrical contact arrangement may include electrical contact structures or terminals, e.g. contact pins, arranged within the second receiving opening. In particular, the contact structures of the second electrical contact arrangement may be arranged in accordance with IEC 62196 to form a DC-connection of a so called Combo-2 plug. Alternatively, the contact structures of the second electrical contact arrangement may be arranged in accordance with Chinese GB/T 20234.3 standard.

One of the ideas on which the present invention is based is to provide a connector device coupled to an electric cable that may be stowed in and pulled out from a retainer housing while a socket portion that forms an electrical receptacle for a DC-plug is formed stationary, e.g. integrally with the retainer housing. In particular, the retainer housing may include a first receiving opening that receives and holds the connector device therein in a stowage position. For charging an electrical energy storage device of a vehicle with a first charging program, e.g. with an alternating current (AC)-current, the connector device may be pulled out from the first receiving opening together with a portion of the electric cable and being connected to a charging station. By pulling out the connector device from the first receiving opening, the connector device clears the first receiving opening and may, thus, be moved to a detached position. For charging the electrical energy storage device with a second charging program, e.g. with a DC-current, a corresponding charging cable of an external source may be connected to the second electrical contact arrangement by introducing a respective plug into at least the second receiving opening formed with the retainer housing.

It is one of the advantages of the invention that a user may pull out the connector device and the electric cable from the retainer housing. Since the electric cable may be electrically connected with its second end to an interface of the cable storage device, only the electrical connection to the charging station needs to be made manually by the user. This eases handling of the charging cable assembly. Another advantage is that the connector may can be taken out of the first receiving opening separately from the socket portion. Thus, a compact connector device may be realized while the system still provides complete flexibility with regard to DC (direct current)- or AC (alternating current)-loading programs since the second receiving opening of the socket portion is configured to receive a DC-plug.

According to an exemplary embodiment of the system, in the detached position of the connector device, the electric cable extends through the first receiving opening and protrudes from the retainer housing by a length of preferably more than about 0.3 meters. Optionally, the cable protrudes from the retainer housing by a length of preferably less than or equal to about 10 meters.

According to a further exemplary embodiment of the system the connector housing of the connector device may include a sleeve portion having an outer circumferential surface defining a circumferential socket gap with an inner surface of the first receiving opening of the retainer housing when the connector device is arranged in the stowage position, and a fitting portion arranged at an axial end of the sleeve portion, the fitting portion protruding from the outer circumferential surface of the sleeve portion and at least partially forming the outer contact surface of the connector housing. The sleeve portion may extend from a first end of the connector housing with respect to the longitudinal direction.

The fitting portion may protrude radially from the outer circumferential surface of the sleeve portion and may be formed continuously around the whole circumference of the sleeve portion. The fitting portion may be arranged distanced to the first end of the connector housing. In the stowage position of the connector device, a circumferential surface of the fitting portion contacts or abuts the inner surface of the first receiving opening. The outer circumferential surface of the sleeve portion may be arranged distanced to the inner surface of the first receiving opening and thus, a socket gap may be formed between the outer circumferential surface of the sleeve portion and the inner surface of the first receiving opening.

When the connector device is positioned in a stowage position, an external charging plug may be introduced into the socket gap. Thereby, flexibility of the system may further be increased since the connector device, on the one hand, may be plugged into a socket of an external charging station and, on the other hand, a plug from an external charging station may be received in the socket gap. In particular, the inner surface of the first receiving opening, the outer surface of the sleeve portion of the connector housing, and the inner surface of the second receiving opening of the socket portion of the retainer housing may be formed such that they define a type 1 or type 2 combo port for receiving a so called combo 1 or combo 2 charging plug of a combined charging system (CSS) in accordance with IEC 62196.

According to a further exemplary embodiment the retainer device may include a tensioning device supported by a stop of the retainer housing and preloading the connector device in a direction out of the first receiving opening when the connector device is arranged in a stowage position. For example, the tensioning device may include a spring, e.g. a helical spring, which, with a first end, urges against a stop formed at the retainer housing, and, with a second end urges a stop formed at the connector housing of the connector device. The tensioning device may for example also be formed as a tensioning telescopic device. The telescopic device may include a cylinder and a piston guided in the cylinder and tensioned to an extracted position relative to the cylinder, e.g. by a spring or by a gas contained within the cylinder. The tensioning device provides the benefit of supporting the user by pulling out the connector device from the first receiving opening. Thereby, handling of the system may further be eased.

According to one exemplary embodiment, the system may further include a locking mechanism. The locking mechanism may include a locking pin guided in a locking or guiding recess of the retainer housing between a locking position in which the locking pin protrudes into the first receiving opening to be engageable with a locking structure formed at the connector housing, when the connector device is arranged in a stowage position and a retracted position, an actuator coupled to the locking pin for moving the locking pin between the locking position and the retracted position, and a trigger connected to the actuator for activating the actuator.

The locking or guiding recess extends along the retainer radial direction and thus, the guiding pin may be guided along said radial direction. In the locking position, the locking pin protrudes from the inner surface of the first receiving opening of the retainer housing. In the retracted position, the locking pin may be flush with the inner surface of the first receiving opening and generally allows movement of the connector device in the first receiving opening along the retainer longitudinal direction. The locking structure of the connector device may be realized as a recess formed at the outer surface of the connector housing, into which the locking pin may be introduced when the connector device is arranged in the stowage position in the first receiving opening.

The actuator may be mechanically coupled to the locking pin and configured to move the locking pin between the locking position and the retracted position. The trigger may be functionally coupled to the actuator and, upon activation, may be configured to cause the actuator to move the locking pin. The trigger may operate as user interface for deactivating the locking mechanism. The locking mechanism locks the connector device in the stowage position. In particular, the connector device may be unlocked to allow the connector device to be pulled out from the first receiving opening. The pulling out of the connector device may be further supported by the optional tensioning device. Accordingly, handling of the system may be further improved. Additionally, safety of the system may be improved since the locking mechanism reduces the risk that the connector device unintendedly is moved out from the first receiving opening.

According to one exemplary embodiment of the system the actuator of the locking mechanism may be formed by a Bowden cable connected to the locking pin with a first end. The trigger may be formed by a grip attached to a second end of the Bowden cable. A Bowden cable generally includes a pulling wire and a mantle surrounding the pulling wire. The pulling wire is connected to the locking pin and to the grip. The mantle is attached to the retainer housing with one end and, with an opposite end, is attached to a frame portion that is arranged stationary with respect to the retainer housing and optionally may be integrally formed with the retainer housing. A Bowden cable advantageously provides a very simple and reliable actuator mechanism.

According to one exemplary embodiment the trigger may be formed by a movable activator, for example by a push button, and the actuator may be formed by a mechanical gear mechanism, for example by a rod drive or a crank drive, wherein the gear mechanism may be mechanically connected to the movable activator and the locking pin, the gear mechanism being configured to translate movement of the activator into movement of the locking pin. According to this concept, the actuator may be formed as a gear unit which mechanically translates movement of the trigger into movement of the locking pin. Accordingly, another efficient and reliable actuating mechanism may be provided.

According to one exemplary embodiment the actuator may be formed by an electrical drive motor, in particular by a linear motor, and the trigger may be formed by an electrical switch configured to electrically connect the electrical drive motor to an electrical voltage source. In other words, the electrical drive motor moves the locking pin between a locking position and a retracted position. The motor may be activated by closing a switch forming the trigger. Accordingly, another reliable and easy operable actuating mechanism may be provided.

According to a further exemplary embodiment the retainer device may include an arresting pin being movable between an arresting position, in which the arresting pin engages the locking pin of the locking mechanism in a locking position, and a retracted position, in which the arresting pin is retracted from the locking pin of the locking mechanism. The arresting pin may include a catch portion that protrudes into the socket gap to be movable into the arresting position by introducing a charging plug into the socket gap. The arresting pin may be guided by a guiding structure, e.g. a recess or a groove, of the retainer housing along the retainer longitudinal direction. The arresting pin may include a catch that laterally protrudes from a pin body of the arresting pin.

A front end of the pin body may be engaged with a locking structure, e.g. a recess, of the locking pin, when the locking pin is arranged in a locking position. The arresting pin, thus, advantageously locks the locking pin and thereby further reduces the risk of unintended movement of the connector device within the first receiving opening. In particular, by introducing the charging plug into the socket gap formed between the sleeve portion of the connector housing and the inner surface of the first receiving opening, the arresting pin may be automatically urged into an arresting position. Accordingly, safety may further be improved and handling of the system may be further eased.

Optionally, the arresting pin may be preloaded into a retracted position by a tensioning device. Accordingly, when the charging plug is pulled out from the socket gap, the arresting pin may be automatically moved back into a retracted position which further eases handling of the system. The tensioning device may be realized by a spring being tensioned between the retainer housing and the arresting pin or by similar tensioning devices.

According to a further exemplary embodiment of the system, the connector device may further include a cover of electrically insulating material coupled to the connector housing and positionable to cover the electrical contact arrangements. The cover may, for example, be formed from a plastic material. Generally, the cover may include a plate shaped member and a lip member that protrudes from the plate shaped member. The lip member defines a closed circumference that corresponds to the outer surface in an end portion of the connector housing, e.g. to the outer surface of the sleeve portion. Accordingly, the cover may be easily fitted to the connector housing.

According to a second aspect of the invention, an electric vehicle is provided. The electric vehicle may include a vehicle body, an electrical energy storage device, such as a battery, and a charging cable system according to the first aspect of the invention. The retainer device of the charging cable system may be attached to the vehicle body, e.g. to a C-pillar of the vehicle body. The electric cable of the charging cable assembly and the second contact arrangement accommodated in the second receiving opening of the socket portion may each be electrically connected to the electrical energy storage device. For example, an electrical interface of the cable storage device, to which the electrical cable is connected, may be connected to the electrical energy storage device.

According to a third aspect of the invention, a method for charging the electric vehicle of the second aspect is provided. The method may include moving the connector device from a stowage position to a detached position by moving the connector device out of the first receiving opening, and connecting the connector device of the charging cable system to a station charging socket of a charging station to electrically connect the first electric contact arrangement of the connector device to a contact arrangement of the station charging socket. The contact arrangement of the station charging socket may be electrically connected to an AC power source.

In other words, according to this aspect of the invention, the connector device may be pulled out of the retainer housing and mechanically and electrically connected to a socket of a charging station. Accordingly, the electrical energy storage device of the vehicle may be connected to the AC power source of the charging station. An inverter may be configured to convert the AC current provided by the AC power source into DC current.

According to a fourth aspect of the invention a method for charging the electric vehicle of the second aspect is provided. The vehicle may include a cable system according to the first aspect of the invention. The connector housing may include a sleeve portion having an outer circumferential surface defining a circumferential socket gap with an inner surface of the first receiving opening of the retainer housing when the connector device is arranged in the stowage position, and a fitting portion arranged at an axial end of the sleeve portion, the fitting portion protruding from the outer circumferential surface of the sleeve portion and at least partially forming the outer contact surface of the connector housing.

The method according to this aspect of the invention, in a first variant may include introducing a charging plug into the socket gap to electrically connect the first electric contact arrangement of the connector device to a contact arrangement of the charging plug, the contact arrangement of the charging plug being electrically connected to an AC power source. Hence, a charging plug of a charging station may be introduced into the socket gap to electrically connect the electrical energy storage device of the vehicle the AC power source of the charging station. An inverter may be configured to convert the AC current provided by the AC power source into DC current.

The method according to this aspect of the invention, in a second variant may include introducing a first, AC-plug portion of a combined charging plug into the socket gap, and introducing a DC plug portion of the combined charging plug into the second receiving opening of the socket portion of the retainer housing to electrically connect the second electric contact arrangement accommodated in the second receiving opening to a contact arrangement of the DC plug portion of the combined charging plug, the contact arrangement of the DC plug portion being electrically connected to a DC power source. Hence, a combined charging plug may be introduced into the socket gap between the retainer housing and the connector device and into the socket portion of the retainer housing. Accordingly, the electrical energy storage device may be connected to the DC power source of the charging station. Optionally, the signal plug portion may include a signal contact arrangement electrically connected to at least one contact terminal of the electrical first contact arrangement of the connector device for transmission of data or other signals.

According to one example of the system, the cable storage device may be realized as a cable reel which is rotatably mounted about a reel rotational axis. The electric cable is windable to the cable reel in a first rotational direction and dewindable from the cable reel in a second rotational direction. The cable reel may include a rewind mechanism, for example a spiral spring or an electrical actuator, preloading the cable reel about its rotational axis in the first rotational direction. Accordingly, a mechanically rewind mechanism may be realized.

Optionally, the cable reel may include a rotation sensor, in particular a Hall-sensor, configured to detect rotational movement of the cable reel and configured to output a sensor signal indicating rotational movement. The electric vehicle may include an electrical switch configured to interrupt the electrical connection between the electric cable and the electrical energy storage device upon activation, and a controller connected to the rotation sensor of the cable reel and to the switch. The controller may be configured to activate the switch in response to receive a sensor signal from the rotation sensor that indicates rotation of the cable reel. Accordingly, the risk of coming into contact with structures being under electrical voltage during winding-off the electric cable may be minimized. The Hall-sensor may be configured to detect a length of the cable that has been drawn from the cable reel or generally from the cable storage device. The controller may include a processor and a data storage medium readable by the processor. For example, the controller may include a microprocessor.

The features and advantages described for the first aspect of the invention are also disclosed for the second aspect of the invention and vice versa.

With respect to directions and axes, in particular with respect to directions and axes concerning the extension or expanse of physical structures, within the scope of the present invention, an extent of an axis, a direction, or a structure "along" another axis, direction, or structure includes in particular that said axes, directions, or structures, in particular tangents which result at a particular site of the respective structures, enclose an angle which is less than about 45 degrees, preferably less than about 30 degrees and in particular preferable extend parallel to each other. With respect to directions and axes, in particular with respect to directions and axes concerning the extension or expanse of physical structures, within the scope of the present invention, an extent of an axis, a direction, or a structure "crossways", "across", "cross", or "transversal" to another axis, direction, or structure includes in particular that said axes, directions, or structures, in particular tangents which result at a particular site of the respective structures, enclose an angle which is greater or equal than about 45 degrees, preferably greater or equal than about 60 degrees, and in particular preferable extend perpendicular to each other.

BRIEF DESCRIPTION OF THE FIGURES

For a more complete understanding of the present invention and advantages thereof, reference is now made to the following description taken in conjunction with the accompanying drawings. The invention is explained in more detail below using exemplary embodiments, which are specified in the schematic figures, in which:

FIG. 1 shows a schematic view of an electric vehicle according to an exemplary embodiment of the invention during charging at an off-board charging station;

FIG. 2 shows a schematic plan view of a connector device being arranged in a stowage position in a retainer device of a charging cable system according to an exemplary embodiment of the invention;

FIG. 3 shows a schematic perspective view of a charging cable system according to an exemplary embodiment of the invention;

FIG. 7 shows a schematic view of a charging cable system according to a further exemplary embodiment of the invention; and FIG. 8 shows a detailed view of the area of FIG. 8 marked with letter Z according to an exemplary embodiment of the invention;

FIG. 9 shows the charging cable system of FIG. 7 used in a method according to a further exemplary embodiment of the invention.

Unless indicated otherwise, like reference numbers or signs to the figures indicate like elements.

DETAILED DESCRIPTION

Figure 4:
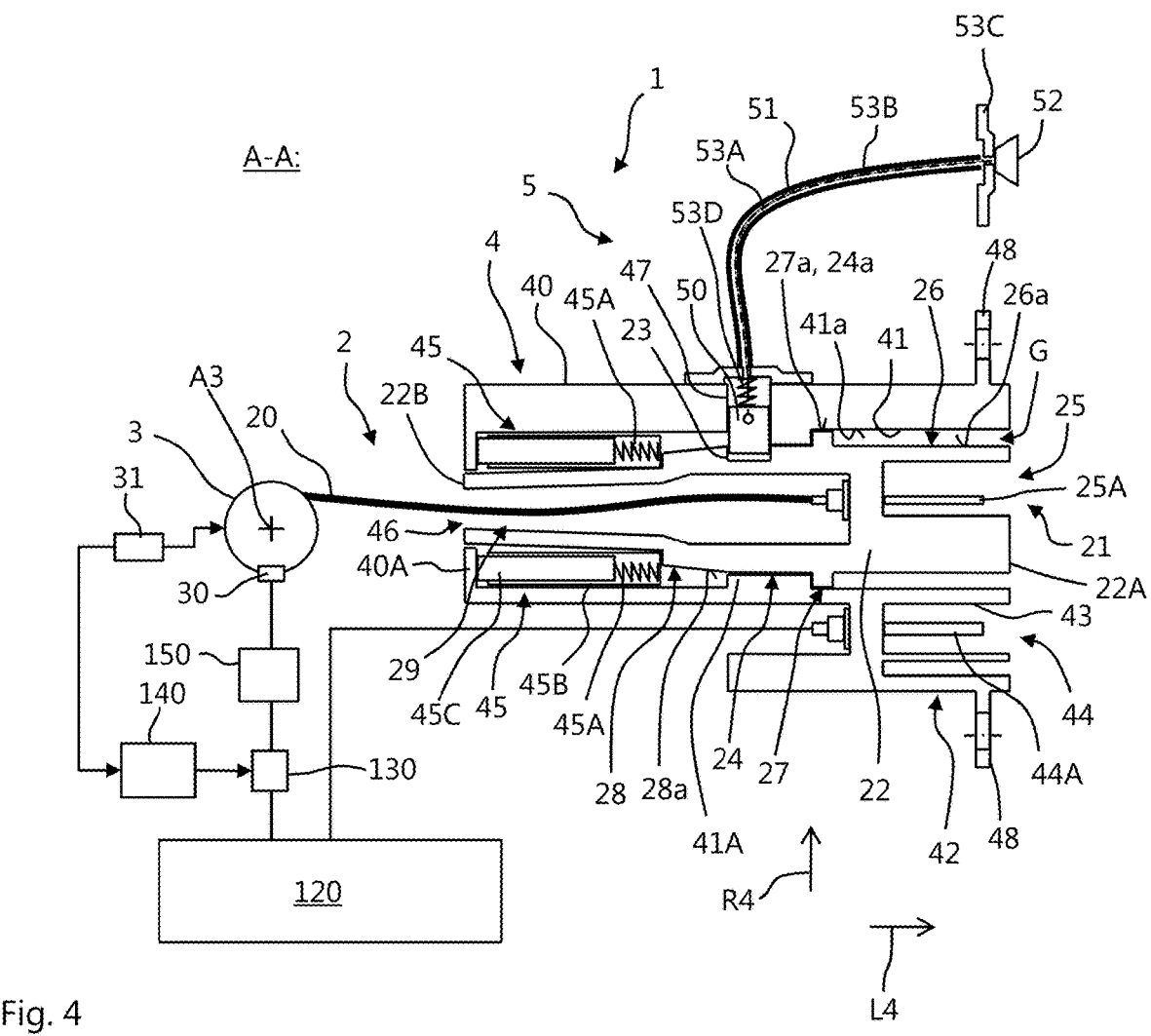
FIG. 4 shows a schematic sectional view of a charging cable system according to an exemplary embodiment of the invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

FIG. 1 exemplarily shows an electric vehicle 100 in a state of being charged at charging station S. The vehicle 100 may include a vehicle body 110, an electrical energy storage device 120, and a charging cable system 1. Further, the vehicle 100 may include an electrical motor (not shown) for propulsion of the vehicle 100. The electrical motor may be electrically connected to the electrical energy storage device 120. The vehicle body 110 defines an interior compartment of the vehicle 100 and may include an A-pillar 110A, a B-pillar 110B, and a C-pillar 110C as schematically illustrated in FIG. 1. The electrical energy storage device 120 is merely symbolically shown in FIG. 1 as a block and may for example be a lithium-ion battery or similar rechargeable battery.

As will be explained in more detail below, the charging cable system 1 may include a charging cable assembly 2 having an electric cable 20 and a connector device 21 coupled to a first end of the electric cable 20. The electric cable 20 may be electrically connected to the energy storage device 120. The connector device 21 forms an electrical interface and may be plugged into a corresponding receptacle at the charging station S, as is schematically illustrated in FIG. 1. Accordingly, the energy storage device 120 may be electrically connected to an electrical energy source (not shown) of the charging station S and may be charged.

FIG. 2 shows a front view of a charging cable system 1, FIG. 3 shows a perspective partial view of the charging cable system 1, and FIG. 4 exemplarily shows a partial sectional view of the charging cable system 1. As shown from FIG. 4, the charging cable system 1 may include a charging cable assembly 2, a cable storage device 3, a retainer device 4, and an optional locking mechanism 5. As shown in FIG. 2, the system 1 may further include an optional cover 6.

The electric cable 20 is merely schematically shown in FIG. 4 and may include a mantle of electrically insulating material, such as plastic, and various conductor wires (not shown) enclosed by the mantle. The connector device 21 may include a connector housing 22 and a first electric connector arrangement 25. As exemplarily shown in FIG. 4, the connector housing 22 may be realized as longitudinal form part defining an interior and extending between a front end 22A and an opposite rear end 22B. The connector housing 22 may include a sleeve portion 26 that extends from and defines the front end 22A, an optional fitting portion 27, and a rear portion 28 defining the rear end 22B of the connector housing 22. An outer surface 24 of the connector housing 22 may define an outer circumference that varies between the front end 22A and the rear end 22B. For example, as shown in FIGS. 2 and 3, the sleeve portion 26 may include an outer circumferential surface 26a defining a segment of a circle including an even or flat section.

As is exemplarily shown in FIG. 4, the optional fitting portion 27 may be arranged at an axial end of the sleeve portion 26, that is, distanced with respect to the first end 22A of the connector housing 22. The fitting portion 27 may protrude radially from the outer circumferential surface 26a of the sleeve portion 26 and may include an outer fitting surface 27a. The fitting portion 27 may extend at least partially about the circumference of the sleeve portion 26. The outer fitting surface 27a may define a circumference that is shaped to correspond to the circumference of the sleeve portion 26.

The rear portion 28 may include an outer surface 28a that optionally defines a circular or other circumferential shape. Generally, the connector housing 22 may include an outer surface 24. As is exemplarily shown in FIG. 4, the outer surface 24 of the connector housing 22 may be formed by the outer circumferential surface 26a of the sleeve portion 26, the outer fitting surface 27a of the fitting portion 27, and the outer surface 28a of the rear portion 28. As schematically shown in FIG. 4, the connector housing 22 may include a rear opening 29 that extends from the rear end 22B, wherein the electric cable 20 may be introduced into the rear opening 29 of the connector housing 22 with a first end.

The connector housing 22 may be made of an electrically insulating material, e.g. a plastic material such as Polyethylene or Polyvinylchloride. For example, the connector housing 22 may be manufactured in an injection molding process or by additive layer manufacturing. As is further exemplarily shown in FIGS. 2 to 4, the first electrical contact arrangement 25 may include various electrical contact structures 25A such as contact pins that are exposed at the first end 22A of the connector housing 22 via openings. The contact structures 25A and generally the first electrical contact arrangement 25 may be realized such that a type 1 or type 2 connector in in accordance with IEC 62196 is formed.

The electrical conductors (not shown) of the cable 20 may be electrically connected with the contact structures 25A of the first electrical contact assembly 25. Generally, the first electric contact arrangement 25 may be accommodated within the connector housing 22. The cable storage device 3 exemplarily shown in FIG. 4 may be realized as a cable reel rotatable about a rotational axis A3. The electrical cable 20 may be winded to the cable reel for storing and de-winded from the cable reel during charging as shown in FIG. 1. Of course, other types of cable storage devices 3 may be provided. The cable storage device 3 may include an electrical connection interface 30 to which the electrical cable 20, i.e. the electrical conductors of the cable 20, may be connected. As is further shown in FIG. 4, the cable 20 may be connected to the energy storage device 120 via the electrical connection interface 30 of the cable storage device 3.

As exemplarily shown in FIG. 4, the retainer device 4 may include a retainer housing 40, and an optional a tensioning device 45. The retainer housing 40 may include a first receiving opening 41 that receives the connector device 21, and a socket portion 42 that receives a DC-charging plug portion P2 of a charging plug P (FIG. 7). The retainer housing 40 may, for example, be made of a plastic material or a metal material. For example, the retainer housing 40 may be manufactured in an injection molding or additive layer manufacturing process.

As schematically shown in FIG. 4, the retainer housing 40 may be realized as a 3-dimensional form part. The first receiving opening 41 may be formed at a front end of the retainer housing 41 and may be defined by an inner surface 41a of the retainer housing 40, the inner surface 41a extending in a retainer longitudinal direction L4. As is schematically shown in FIGS. 2 and 4, the inner surface 41a defines a cross-section of the first receiving opening 41 that corresponds to an outer contact surface 24a of the connector housing 22. The outer contact surface 24a of the connector housing 22 may, for example, be formed by the outer fitting surface 27a of the fitting portion 27 of the connector housing 22.

As is exemplarily shown further in FIG. 4, the retainer housing 40 may include rear opening 46 connected to the first receiving opening 41 and that extends in the retainer longitudinal direction L4 from a rear end of the retainer housing 40. The socket portion 42 defines a second receiving opening 43 that extends in the retainer longitudinal direction L4 from the front end of the retainer housing 40. The second receiving opening 43 may be arranged adjacent to the first receiving opening 41 with respect to a retainer radial direction R4 which extends transverse to the retainer longitudinal direction L4.

As is schematically shown in FIGS. 2 to 4, the second receiving opening 43 may accommodate a second electric contact arrangement 44. As exemplarily shown in FIGS. 3 and 4, the second electric contact arrangement 44 may include electrical contact structures 44A, e.g. contact pins exposed through the second receiving opening 43. As shown from FIG. 4, the electrical contact structures 44A of the second electric contact arrangement 44 may be electrically connected to the electrical energy storage device 120 of the electric vehicle 100. The contact structures 44A of the second electrical contact arrangement 44 may, for example, be arranged in accordance with IEC 62196 for receiving a DC-connection of a so called Combo-2 plug. The retainer housing 40 may optionally further include flange portions 48 for attaching the retainer housing 40 to the vehicle body 110. As exemplarily shown in FIG. 4, the flange portions 48 may be realized as lugs that extend in the retainer radial direction R4.

FIG. 4 shows the connector device 21 arranged in a stowage position. In the stowage position, the connector housing 22 may be received within the first receiving opening 41 of the retainer housing 40. In particular, the outer contact surface 24a of the connector housing 22, i.e. the outer fitting surface 27a of the optional fitting portion 27 is in contact or abuts the inner surface 41a of the first receiving opening 41. Optionally, the outer surface 28a of the rear portion 28 of the connector housing 22 may also form part of the outer contact surface 24a of the connector housing 22 and may be in contact with a reduction portion 41A of the inner surface 41a of the first receiving opening 41 having a reduced diameter. Optionally, the fitting portion 27 with respect to the retainer longitudinal direction L4 may abut against a stop formed by the reduction portion 41 of the inner surface 41a of the first receiving opening 41, as shown in FIG. 4.

The electric cable 20 may be introduced into the retainer housing 40 through the rear opening 46 of the retainer housing 40. When a user desires to charge the energy storage device 120, the connector device 21 may be pulled out from the retainer housing 40 from a stowage position to a detached position (FIG. 10) by moving the connector device 21 along the retainer longitudinal direction L4 out of the first receiving opening 41 to clear the receiving opening 41. This movement may be supported by the optional at least one tensioning device 45. As exemplarily shown in FIG. 4, two tensioning devices 45 are provided. In the example of FIG. 4, each tensioning device 45 may include a spring 45A disposed between a cylinder 45B and a piston 45C, wherein the piston may be axially guided by the cylinder 45B.

The piston 45C abuts a stop 40A formed by a radial protrusion provided at the rear end of the retainer housing 40. The cylinder 45B abuts a stop 40A formed by a step defined by the outer surface 28a of the rear portion 28 of the connector housing 22. Notably, other structures may be provided for supporting the tensioning device 45, and the tensioning device 45 may comprise another configuration. For example, the tensioning device 45 may include the spring 45A. Generally, the tensioning device may be supported by a stop 40A of the retainer housing 40 and may preload the connector device 21 in a direction out of the first receiving opening 41, i.e. the retainer longitudinal direction L4, when the connector device 21 is arranged in a stowage position.

When the connector device 21 is moved out of the retainer housing 40 from the stowage position to the detached position, the cable 20 is withdrawn from the cable storage device 3. As is exemplarily shown in FIG. 4, the cable reel that in this example forms the cable storage device 3 may include a rotation sensor 31, in particular a Hall-sensor, configured to detect rotational movement of the cable reel and output a sensor signal that indicates rotational movement. The vehicle 100 may include an electrical switch 130 configured to interrupt the electrical connection between the electric cable 20 and the electrical energy storage device 120 upon activation, and a controller 140, e.g. a microprocessor, connected to the rotation sensor 31 and to the switch 130. The controller 140 may be configured to activate the switch 130 in response to receiving a sensor signal from the rotation sensor 31 that indicates rotation of the cable reel.

As is exemplarily shown in FIGS. 2 and 4, the outer circumferential surface 26a of the sleeve portion 26 may be dimensioned such that a circumferential socket gap G is defined between the inner surface 41a of the first receiving opening 41 and the outer circumferential surface 26a of the sleeve portion 26, when the connector device 21 is arranged in the stowage position. The outer fitting surface 27a of the fitting portion 27 is in contact with the inner surface 41a of the first receiving opening 41. Hence, the fitting surface 27a may be guided along the retainer longitudinal direction L4 by the inner surface 41a of the first receiving opening 41 when moved along the longitudinal direction L4, while the outer circumferential surface 26a of the sleeve portion 26 may be arranged distanced to the inner surface 41a of the first receiving opening 41 with respect to the retainer radial direction R4.

As schematically shown in FIG. 7, the socket gap G allows introducing a plug P into the socket gap G, e.g. a plug P of a charging station, when the connection device 21 is arranged in the stowage position. Accordingly, electrical contact between contact structures or terminals of the plug P may be made with the first electrical contact arrangement 25 of the connector device 21. In FIG. 7, a combined charging system (CCS) plug P is schematically shown which, according to IEC 62196, may include a first, signal or AC-plug portion P1 and a second, DC-plug portion P2, wherein the electrical contacts of the first, AC-plug portion P1 may be arranged in a type 1 or in a type 2 arrangement as defined in IEC 62196.

In particular, the first, AC-plug portion P1 may include a signal terminal (not shown) configured to transmit data or control signals to the vehicle 100, e.g. to the controller 140, via a corresponding signal terminal (not shown) of the first contact arrangement 25 of the connector device 21. The first, signal or AC-plug portion P1 may be introduced into the socket gap G, while the second, DC-plug portion P2 may be introduced into the second receiving opening 43 of the socket portion 42 of the retainer housing 40. Accordingly, the second electric contact arrangement 44 accommodated in the second receiving opening 43 of the socket portion 42 may be electrically connected to a contact arrangement (not shown) of the DC-plug portion P2 of the combined charging plug P which, in turn, may be electrically connected to a DC power source U1 of a charging station S. As shown from FIGS. 4 and 7, thereby, the electrical energy storage device 120 may be connected to the DC power sources U1 for charging.

FIG. 9 exemplarily shows the system of FIG. 7, wherein an AC plug is provided as a charging plug P for charging the energy storage device 120 of the vehicle by another method. The charging plug P may include a contact arrangement (not shown) electrically connected to an AC power source U2. Similar as explained above with respect to FIG. 7, when the connection device 21 is arranged in the stowage position, the plug P may be introduced into the socket gap G. Accordingly, electrical contact between contact structures or terminals of the plug P may be made with the first electrical contact arrangement 25 of the connector device 21. As shown from FIGS. 4 and 9, thereby, the electrical energy storage device 120 may be connected to the AC power source U2 of the charging station S via the inverter 140 to charge the electrical energy storage device 120.

Figure 10:
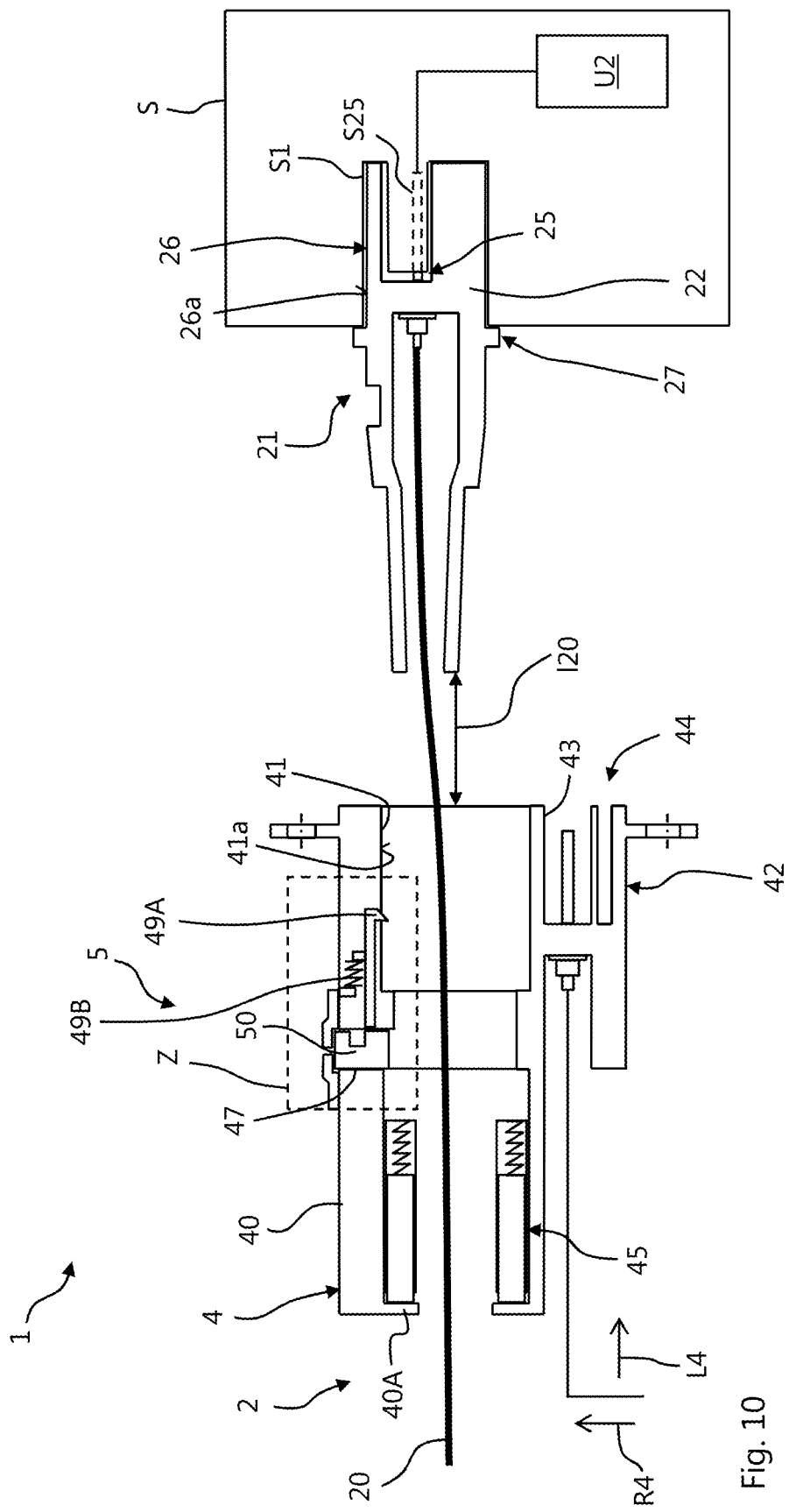
FIG. 10 shows the charging cable system of FIG. 7 used in a method according to a further exemplary embodiment of the invention.

In FIG. 10, a further method for charging the electrical energy storage device 120 is schematically shown. In particular, the connector device 21 may be moved out of a stowage position to a detached position to clear the first receiving opening 41. For example, the connector device 21 may be pulled out of the first receiving opening 41 together with a portion 120 of the cable 20 which is withdrawn from the cable storage device 3. For example, the portion 120 may have a length within a range between about 0.3 meters and 10 meters. The connector device 21 of the charging cable system 1 is may be or introduced into a station charging socket S1 of a charging station S.

The outer circumferential surface 26a of the sleeve portion 26 of the connector housing 22 may be contacted to an inner surface of an opening defined by the station charging socket S1. By introducing the connector device 21 into the station charging socket S1, the first electric contact arrangement 25 of the connector device 21 may be electrically connected to a contact arrangement S25 of the station charging socket S1. The contact arrangement S25 of the station charging socket S1, in turn, may be electrically connected to an AC power source U2. Consequently, the energy storage device 120 of the vehicle 100 may be electrically connected to the AC power source U2 of the charging station S by the charging cable system 1.

As is schematically shown in FIG. 4, the optional locking mechanism 5 may include a locking pin 50, an actuator 51, and a trigger 52. The locking pin 50 may be guided in a locking recess 47 of the retainer housing 40. The locking recess 47 may extend in the retainer radial direction R4 as exemplarily shown in FIG. 4. The locking pin 50 may be guided between a locking position and a retracted position. FIG. 4 shows the locking pin 50 arranged in a locking position in which the locking pin 50 protrudes into the first receiving opening 41. Thereby, the locking pin 50 may be engaged with a locking structure 23 formed at the connector housing 22 when the connector device 21 is arranged in the stowage position and a retracted position. As exemplarily shown in FIG. 4, the locking structure 23 may be realized by a recess formed in the outer surface 24 of the connector housing 22, i.e. a recess formed in the outer surface 28a of the rear portion 28. In the retracted position (not shown) the locking pin 50 may be flush with the inner surface 41a of the first receiving opening 41 and generally allows movement of the connector device 21 in the first receiving opening 41 along the retainer longitudinal direction L4.

The actuator 51, in general, may be mechanically coupled to the locking pin 50 to be able to move the locking pin 50 between the locking position and the retracted position. The trigger 52 may be functionally connected to the actuator 51 for activating the actuator 51, that is, for initiating the actuator 51 to cause movement of the locking pin 50. In the example of FIG. 4, the actuator 51 may be formed by a Bowden cable connected to the locking pin 50 with a first end and the trigger 52 may be formed by a grip attached to a second end of the Bowden cable. As schematically shown in FIG. 4, the Bowden cable includes a pulling wire 53A and a mantle 53B surrounding the pulling wire 53A.

The pulling wire 53A may be connected to the locking pin 50 and to the grip. The mantle 53B may be attached to the retainer housing 40 with a first end and, with a second end (e.g., an opposite end), attached to a frame portion 53C that is arranged stationary with respect to the retainer housing 40 and optionally may be integrally formed with the retainer housing 40. As shown from FIG. 4, by pulling at the grip forming the trigger 52, the wire 53A moves the locking pin 50 from the locking position to a retracted position. Optionally, the locking pin 50 may be preloaded to a locking position by a spring 53D as exemplary shown in FIG. 4.

Figure 5:
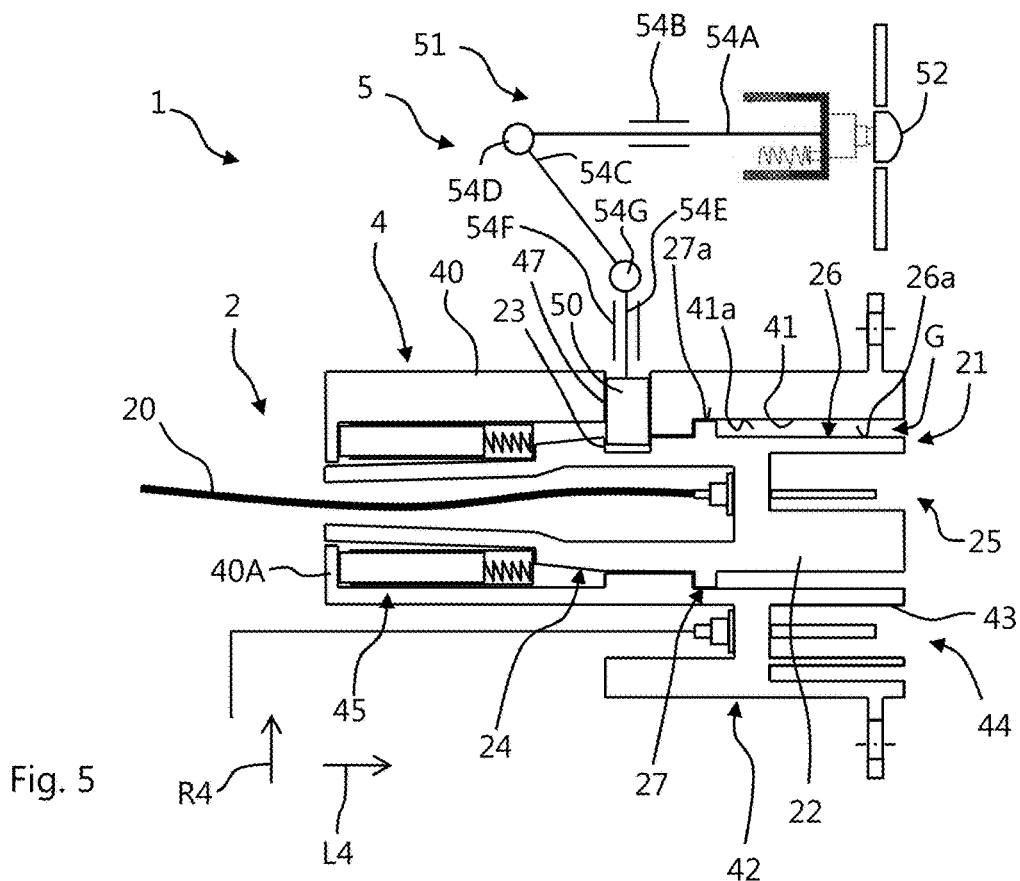
FIG. 5 shows a schematic view of a charging cable system according to a further exemplary embodiment of the invention.

FIG. 5 shows a further example of a charging cable system 1 that differs from the example of FIG. 4 by the locking mechanism 5. As schematically shown in FIG. 5, the trigger 52 may formed by a movable activator, e.g. a push button, and the actuator 51 may formed by a mechanical gear mechanism mechanically connected to the movable activator and the locking pin 50. In the example of FIG. 5, the gear mechanism is realized as a rod drive having a first rod 54A coupled to the push button forming the trigger 52 and being axially guided by a first guide structure 54B, a second rod 54C pivotally coupled to the first rod 54A by a first pivot joint 54D, and a third rod 54E.

The third rod 54E may be axially guided in the retainer radial direction R4 by a second guide structure 54F, may be coupled to the locking pin 50, and may be pivotally connected to the second rod 54C via a second pivot joint 54G arranged such that the first rod 54A and the second rod 54C enclose an angle equal or less than about 90 degree. Accordingly, as shown from FIG. 5, axial movement of the push button may be translated into movement of the locking pin 50 through the rod drive. Of course, other gear mechanisms may be employed that are configured to translate movement of the activator into movement of the locking pin 50, e.g. a crank drive.

Figure 6:
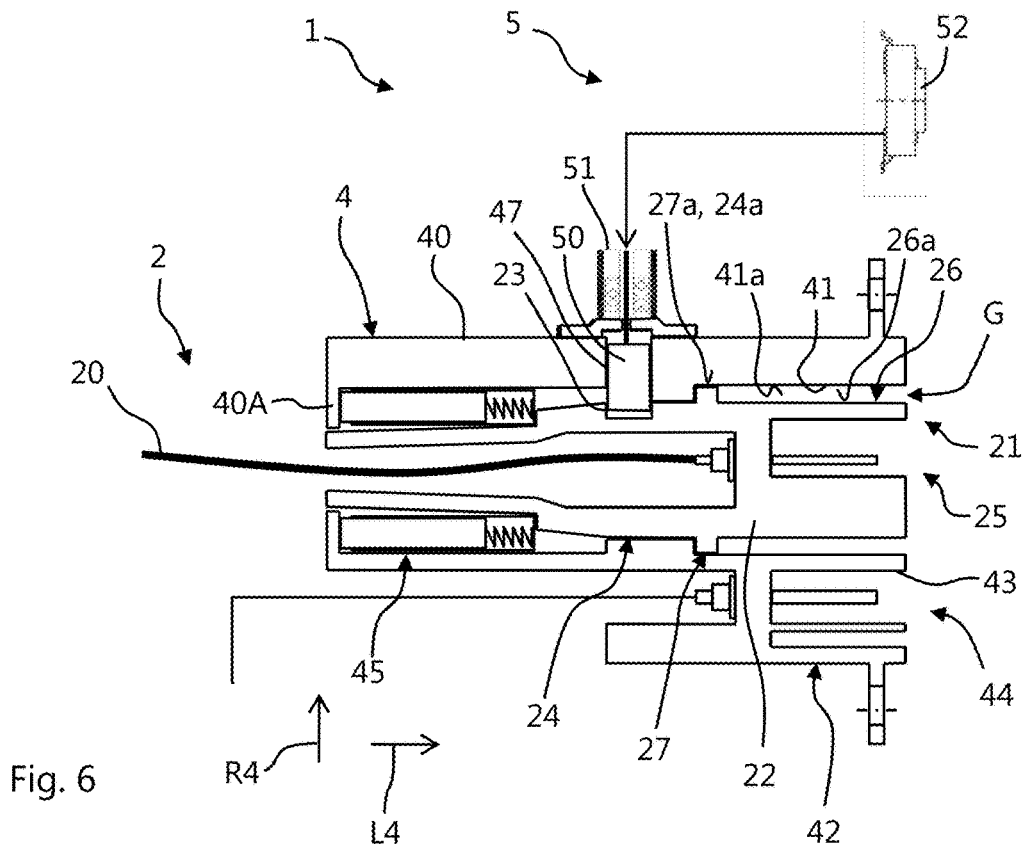
FIG. 6 shows a schematic view of a charging cable system according to a further exemplary embodiment of the invention.

FIG. 6 shows a yet further example of a charging cable system 1 that differs from the example of FIG. 4 by the locking mechanism 5. As exemplarily shown in FIG. 5, the actuator 51 may be formed by a linear motor or another electrical drive motor that is arranged stationary relative to the retainer housing 40 and coupled to the locking pin 50. The trigger 52 in the example of FIG. 6 may be formed by an electrical switch which, in a closed state, may connect the drive motor forming the actuator to an electrical voltage source (not shown) to activate the drive motor to move the locking pin 50 from the locking position shown in FIG. 6 to the retracted position.

The charger cable system 1 exemplarily shown in FIG. 7 may include a locking mechanism 5 as described above with reference to FIGS. 4 to 6. The system 1 exemplarily shown in FIG. 7 differs from the systems 1 of FIGS. 4 to 6 in that the retainer device 4 may further include an optional arresting pin 49. The arresting pin 49 may include a longitudinally extending pin body 49C and a catch portion 49A that protrudes from the pin body 49C. As shown in FIGS. 7 and 8, the catch portion 49A may be arranged at a first end of the pin body 49C. The arresting pin 49, in particular the bin body 49C may be guided between an arresting position and a locking position. Optionally, the arresting pin 49 may be guided by the retainer housing 40, for example by a groove or a similar guiding structure formed in the retainer housing 40, preferably along the retainer longitudinal direction L4.

FIG. 7 shows the arresting pin 49 in a retracted position. FIG. 8 shows the arresting pin 49 in an arresting position. As shown in FIG. 8, the arresting pin 49 engages a receiving structure 50A of the locking pin 50 of the locking mechanism 5. As exemplarily shown in FIGS. 7 and 8, the receiving structure 50A of the locking pin 50 may be formed as a recess. In the retracted position of the arresting pin 49, the arresting pin 49 may be retracted from the locking pin 50 to allow the locking pin 50 to be moved in a retracted position by the actuator 51. Optionally, the arresting pin 49 may be preloaded into a retracted position by a tensioning device 49B, e.g. a spring as shown in FIG. 7. The tensioning device 49B may abut with a first end to the retainer housing 40 and, with a second end, to the locking pin 49.

The catch portion 49A of the arresting pin 49 at least in the retracted position of the arresting pin 49 may protrude into the socket gap G, as schematically shown in FIG. 7. When the charging plug P is introduced into the socket gap G, the plug P engages the catch portion 49A of the arresting pin 49 and, when being moved further in the retainer longitudinal direction L4 into the gap G, pushes or moves the arresting pin 49 in an arresting position. Optionally, the arresting pin 49 may be formed of an elastically deformable material, e.g. a plastic material or a metal material such as spring steel. Thus, the plug P may laterally push away the catch portion 49A and move beyond the catch portion 49A as exemplarily shown in FIG. 8.

Referring again to FIG. 2, the connector device 21 may further include an optional cover 6. The cover 6 may, for example, be formed from a plastic material or generally a plastic material. As schematically shown in FIG. 2, the cover 6 may include a plate shaped member 61 and a lip member 62 that protrudes from the plate shaped member 61. The lip member 62 defines a closed circumference that corresponds to the outer surface in an end portion of the connector housing 22, e.g. to the outer surface 26a of the sleeve portion 26. The cover 6 may, for example, be coupled to the connector device 21 by a holding band 63, as schematically shown in FIG. 2.

Referring again to FIG. 4, the configuration of the charging cable system 1 with respect to the electric vehicle 100 will be described in the following. The retainer device 4 may be attached to the vehicle body 110, for example in the area of the C-pillar 110C. Attachment to the vehicle body 110 may be, for example, realized by aid of the flange portions 48 of the retainer housing 40.

As already discussed above, the electric cable 20 may be electrically connected to the electrical connection interface 30 of the cable storage device 3 which, in turn may be electrically connected to the electrical energy storage device 120 of the vehicle 100. Optionally, an inverter 150 may be connected between the electrical connection interface 30 of the cable storage device 3 and the energy storage device 120. The second electric contact arrangement 44 may also be electrically connected to the energy storage device 120. Thus, the energy storage device 120 may be charged via the first electric contact arrangement 25 of the connector device 21, e.g. by an AC-current, or via the second electric contact arrangement 44 provided at the socket portion 42 of the retainer housing 40, e.g. with a DC current.

Although the here afore-mentioned charger cable system 1 has been described in connection to an electric vehicle 100 such as an automobile or other street vehicle. For a person skilled in the art it is clearly and unambiguously understood that the here described system 1 can be applied to various objects which comprise electrical energy storage devices.

The invention has been described in detail referring to exemplary embodiments. However, it will be appreciated by those of ordinary skill in the art that modifications to these embodiments may be made without deviating from the principles and central ideas of the invention, the scope of the invention defined in the claims, and equivalents thereto.

REFERENCE LIST 1 charging cable system
2 charging cable assembly
3 cable storage device
4 retainer device
5 locking mechanism
6 cover
20 electric cable
21 connector device
22 connector housing
23 locking structure
24 outer surface of connector housing
24a outer contact surface
25 first electric contact arrangement
25A electrical contact structures
26 sleeve portion
26a outer circumferential surface of the sleeve portion
27 fitting portion
27a outer fitting surface
28 rear portion
28a outer surface of the rear portion
29 rear opening
30 electrical connection interface
31 rotation sensor
40 retainer housing
40A stop
41 first receiving opening
41a inner surface of first receiving opening
41A reduction portion
42 socket portion
43 second receiving opening
44 second electric contact arrangement
44A electrical contact structures
45 tensioning device
45A spring 45B cylinder
45C piston
46 rear opening of the retainer housing
47 locking recess
48 flange portion
49 arresting pin
49A catch portion
49B tensioning device
49C pin body
50 locking pin
50A receiving structure of the locking pin
51 actuator
52 trigger
53A pulling wire
53B mantle
53C frame portion
53D spring
54A first rod
54B first guide structure
54C second rod 54C
54D first pivot joint
54E third rod
54F second guide structure
54G second pivot joint
61 plate shaped member
62 lip member
100 electric vehicle
110 vehicle body
110A A-pillar
110B B-pillar
110C C-pillar
120 electrical energy storage device
130 switch
140 controller
150 inverter
A3 rotational axis
G socket gap
120 portion of cable
P charging plug
P1 AC-plug portion
P2 DC-plug portion
S charging station
S1 station charging socket
S25 contact arrangement of the station charging socket
U1 DC power source
U2 AC power source

What is claimed is:

1. A charging cable system for an electric vehicle, comprising:
    a charging cable assembly including an electric cable and a connector device coupled to a first end of the electric cable, the connector device including a connector housing and a first electric contact arrangement accommodated within the connector housing;
    a cable storage device configured to store the electric cable, wherein the electric cable is coupled to the cable storage device; and
    a retainer device including a retainer housing, the retainer housing having a first receiving opening for receiving the connector device and a socket portion arranged adjacent to the first receiving opening for receiving a direct current (DC)-plug portion of a charging plug, the first receiving opening defining a cross-section that corresponds to an outer contact surface of the connector housing,
    wherein the connector device is positionable in a stowage position in which the connector housing is received within the first receiving opening, and in a detached position in which the connector device clears the first receiving opening, the socket portion defining a second receiving opening which accommodates a second electric contact arrangement,
    wherein, in the detached position of the connector device, the electric cable extends through the first receiving opening and protrudes from the retainer housing by a length of more than about 0.3 meters, and
    wherein the connector housing of the connector device includes:
        a sleeve portion having an outer circumferential surface defining a circumferential socket gap together with an inner surface of the first receiving opening of the retainer housing when the connector device is arranged in the stowage position; and
        a fitting portion arranged at an axial end of the sleeve portion, the fitting portion protruding from the outer circumferential surface of the sleeve portion and at least partially forming the outer contact surface of the connector housing.

2. The system according to claim 1, wherein the retainer device includes a tensioning device supported by a stop of the retainer housing and preloading the connector device in a direction out of the first receiving opening when the connector device is arranged in the stowage position.

3. The system according to claim 1, further comprising:
    a locking mechanism including a locking pin guided in a locking recess of the retainer housing between a locking position in which the locking pin protrudes into the first receiving opening to be engageable with a locking structure formed at the connector housing, when the connector device is arranged in the stowage position and a retracted position;
    an actuator coupled to the locking pin for moving the locking pin between the locking position and the retracted position; and
    a trigger connected to the actuator for activating the actuator.

4. The system according to claim 3, wherein the actuator of the locking mechanism is formed by a Bowden cable connected to the locking pin with a first end, and wherein the trigger is formed by a grip attached to a second end of the Bowden cable.

5. The system according to claim 3, wherein the trigger is formed by a movable activator, and wherein the actuator is formed by a mechanical gear mechanism, mechanically connected to the movable activator and the locking pin, the gear mechanism being configured to translate movement of the activator into movement of the locking pin.

6. The system according to claim 3, wherein the actuator is formed by an electrical drive motor, and wherein the trigger is formed by an electrical switch configured to electrically connect the electrical drive motor to an electrical voltage source.

7. The system according to claim 3, wherein the retainer device includes:
    an arresting pin being movable between an arresting position, in which the arresting pin engages the locking pin of the locking mechanism in a locking position, and a retracted position, in which the arresting pin is retracted from the locking pin of the locking mechanism,
    wherein the arresting pin includes a catch portion that protrudes into the socket gap to be movable into the arresting position by introducing a charging plug into the socket gap.

8. The system according to claim 7, wherein the arresting pin is preloaded into the retracted position by a tensioning device.

9. The system according to claim 8, wherein the connector device further includes a cover of electrically insulating material coupled to the connector housing and positionable to cover the electrical contact arrangements.

10. An electric vehicle, comprising:
- a vehicle body;
- an electrical energy storage device; and
- a charging cable system according to claim 1,
- wherein the retainer device is attached to the vehicle body, and
- wherein the electric cable and the second electric contact arrangement each are electrically connected to the electrical energy storage device.

11. A method for charging an electric vehicle according to claim 10, comprising:
- moving the connector device from the stowage position to the detached position by moving the connector device out of the first receiving opening; and
- connecting the connector device of the charging cable system to a station charging socket of a charging station to electrically connect the first electric contact arrangement of the connector device to a contact arrangement of the station charging socket, the contact arrangement of the station charging socket being electrically connected to an alternating current (AC) power source.

12. A method for charging an electric vehicle according to claim 10 having a charging cable system, the method comprising:
- introducing a charging plug into the socket gap to electrically connect the first electric contact arrangement of the connector device to a contact arrangement of the charging plug, the contact arrangement of the charging plug being electrically connected to an AC power source; or
- introducing an alternating current (AC)-plug portion of a combined charging plug into the socket gap, and
- introducing a direct current (DC) plug portion of the combined charging plug into the second receiving opening of the socket portion of the retainer housing to electrically connect the second electric contact arrangement accommodated in the second receiving opening to a contact arrangement of the DC plug portion of the combined charging plug, the contact arrangement of the DC plug portion being electrically connected to a DC power source.

* * * * *